Dec. 9, 1930.     C. ELLIS     1,784,800
FLOOR COVERING AND PROCESS OF MAKING SAME
Filed Nov. 19, 1926
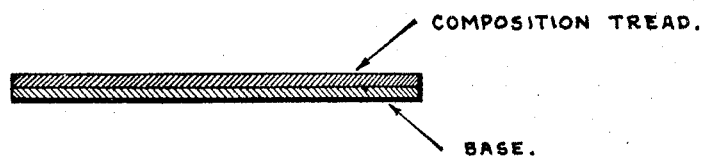
Inventor
CARLETON ELLIS.

Patented Dec. 9, 1930

1,784,800

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

FLOOR COVERING AND PROCESS OF MAKING SAME

Application filed November 19, 1926. Serial No. 149,528.

This invention relates to floor coverings, and to the process of making same, and relates especially to floor coverings of a composite character, that is, built up of layers or strata of dissimilar composition.

The drawing shows a section through a floor covering made in accordance with the present invention.

As an under layer or primary supporting member, I prefer to use what may be termed saturated felt, that is, a felt or web of cloth or paper impregnated with pitch or asphalt.

Attached to this primary supporting material is a coating or sheeting of material containing nitrocellulose and forming the tread or wearing surface of the floor covering.

In carrying out the process of the present invention I prefer to make a composition containing nitrocellulose dissolved in a volatile solvent and incorporated with filling material of a resilient character. Thus I may employ ground cork, wood flour, ground wood, linters, and the like, as filling substances. In addition there may be present an antacid substance such as urea or amines or various mineral bodies such as zinc oxide, zinc hydrate, zinc carbonate, chalk, whiting, marble dust, magnesium oxide, especially the form known as light oxide of magnesia, magnesium carbonate, and other mineral substances capable of neutralizing acidity without acting destructively on nitrocellulose.

In one phase of the invention I also employ resinous substances in conjunction with nitrocellulose, using preferably synthetic resins of a character compatible with pyroxylin. Thus, I may employ the various glyceride or glycol resins. The introduction of these synthetic resins into the nitrocellulose composition tends to increase resistance to alkalies, soap and water, and the like, and also assist in causing the floor covering to remain flat on the floor and not to curl up at the corners.

Another addition is a plasticizer or softener for the nitrocellulose. Thus, I may add substances such as diethyl phthalate, dibutyl phthalate, diamyl phthalate, acetin, dicresyl phosphate, diphenyl phosphate, and boiled or blown castor oil, blown rape oil, fatty acids of vegetable oils, and the like.

The conditions in making floor covering differ substantially from those involved in producing lacquers. A floor rug of the saturated felt type is rolled for shipment and when used is unrolled and must be sufficiently pliable to flatten out when laid on the floor and not remain elevated at the corners or edges. The surface must not be slippery and should be elastic and have a cushiony feel when one walks upon the floor covering. Nitrocellulose compositions employed in making lacquers are usually too hard and brittle for this purpose.

Since the pitch, asphalt, blown petroleum residues, and the like, employed in impregnating or saturating the so-called felt base or supporting member are very easily softened and melted by heat, it is not feasible to apply the tread composition with the application of heat, or at least to employ temperatures which would have a pronounced softening effect on the nitrocellulose composition. For example, if temperatures such as those used in sheeting celluloid were employed in the present instance the asphaltic material would be melted and squeezed out of the felt base. The tread composition of the present invention therefore preferably is applied in the cold, or at a temperature not sufficiently high to impair the quality of the saturated felt. In order to make application in the cold I employ solvents to dissolve the nitrocellulose together with plasticizers, synthetic resins, and the like, which may be used, and incorporate the filling material with such nitrocellulose composition. Sufficient filler is added to make a mass which practically will not flow, but will yield under pressure of the fingers and has sufficient coherance to allow sheeting through ordinary milling or sheeting rolls. For this purpose differential rolls preferably are employed, that is, one roll, usually the one with which the plastic mass is in contact, is rotated at a higher speed than the other.

The sheet or web of the saturated felt thus may be fed in a continuous manner through rolls of this character, while the plastic mixture is being constantly applied to the rolls as it is used and carried away by attachment as a thin smooth sheet to the surface of the saturated felt.

It is important to avoid the use of saturated felt which contains oily substances that would prevent the adhesion of the nitrocellulose composition. Also, it is desirable to avoid the use of solvents which would dissolve the asphalt and discolor the sheeted tread.

While I may employ various recognized nitrocellulose solvents employed in lacquers, and the like, including butyl and amyl alcohols, their acetates and other esters, and various diluents such as toluol, xylol, and petroleum hydrocarbons, I prefer to avoid these high boiling nitrocellulose solvents of a relatively costly nature and use cheap highly volatile solvents. This does not preclude the use of the aforesaid heavy solvents and any of the extensive series of nitrocellulose solvents classed as high boiling. Most of these high boiling solvents, however, besides being expensive have strong odors, and while such solvents will evaporate readily from a thin film such as a lacquer coating, and the odor will thus disappear rapidly, this is not apparent in the same degree in the case of sheeted material as the porous filler preferably used absorbs these solvents and their evaporation from the relatively thick layer of sheeted material is quite slow. Consequently the odor persists.

The effect is the more aggravated when the tread is built up of several layers of sheeted material. That is, one layer is applied and when dried sufficiently to be firm, a second layer is sheeted thereon and this operation continued to whatever extent desired, so that two or more layers of sheeted material constitute the treatment. In order to obtain a greater cushioning effect under foot, it is desirable to make the floor covering with the nitrocellulose composition to obtain a plurality of layers forming the tread. Under these circumstances the elimination of the solvent and the production of a practically odorless product and one which when unrolled at the time of use does not charge the the room with vapors of residual solvent is a matter of difficulty. The time required to dry out such heavier solvents is such that the cost of manufacture likewise is increased due to the larger drying chambers, more heat required and other requirements.

In the present invention in its preferred form I may employ highly volatile solvents such as acetone, methyl acetone, denatured acetone, methyl alcohol, isopropyl alcohol, ethyl acetate, isopropyl acetate, and the like. Also, at least to a certain extent, it is possible to use nitrocellulose non-solvents of the hydrocarbon type, such as benzol or toluol, benzine, gasoline, and so forth. To the plastic composition containing such solvents I preferably add a small amount of wax such as paraffin or ceresin wax, with or without additions of carnauba, Montan, or other polishing waxes. With a small amount of the wax present and properly disseminated through the mass, evaporation of the composition does not take place quickly and the operators therefore have plenty of time to apply the composition to the rolls and sheet it onto the saturated felt without having the material dry out to the point where it becomes too crumbly to be sheeted properly. Also, since the sheeting exposes a large area to evaporation, the pollution of the atmosphere by the vapors of such volatile solvents, were these free to escape readily, would be objectionable to the workmen, besides also possibly being a source of danger from fire or explosion. The presence of the wax in the sheeted plastic prevents rapid drying and enables such cheap solvents to be effectively employed.

On the other hand, an elevation of temperature only slightly above room temperature, causes the wax to lose its function of restraining the evaporation of the solvents in the sheeting composition and they thus may be readily removed by passing into a relatively compact drying chamber, from which, if desired, the solvent vapors may be withdrawn and carried to a solvent recovery apparatus.

Thus, the plastic sheeting composition is very slow drying at room temperature, but very quick drying at slowly elevated temperatures, as for example, at temperatures somewhat above 100° F. and therefore, the beneficial effects of a powerful solvent for nitrocellulose, as for example, acetone, may be secured without any substantial loss by evaporation during the operation of sheeting.

Furthermore, since these volatile substances may be readily expelled from the sheeted material when the temperature is raised a few degrees, the odor of the solvent is quickly eliminated and the unpleasant effects of residual solvent of the high-boiling character referred to above, do not obtain.

While wax has been used heretofore in making compositions for removing paint and varnish, and while wax has been added to varnishes to obtain flatting effects, I am, so far as I am advised, the first to have utilized wax in the manufacture of floor coverings to retain volatile solvents in a semi solid nitrocellulose composition intended to be applied to a saturated felt base or other appropriate supporting web or fabric.

In the case of the paint and varnish remover the object of the application is to soften and remove a coating, whereas, in the present invention I am utilizing the wax to build up a coating. The employment of wax in oil varnishes to obtain a flatting effect has not been very successful owing to the fact that the varnish becomes too slow drying. Thus, it will be evident that the wax employed in my composition accomplishes a result quite different from that demanded or expected in the other uses referred to.

The wax also appears to improve the spreading or setting qualities of the composition, and furthermore, when the coating is dry and the same if desired is put through a burnishing roll, a better polishing effect may be obtained when wax is present in appropriate amount, especially when a portion of such wax is carnauba, Montan, beeswax, shellac wax, or similar high melting point and polishing waxes. If hot burnishing is required the saturated felt portion may be protected by placing beneath it in the burnishing roll a plate or web of asbestos, cloth or other heat insulating fabric, and not employing a temperature or a period of exposure to the hot roll sufficient to soften and dislodge the asphaltic impregnating material.

The floor covering made with a tread sheeted on as described, whether polished by running through a burnisher, or by waxing, lacquering, and the like, is ready for use. It is, however, either of a plain uniform color, e. g., brown, blue, green, red, and the like, depending upon the pigment added, or may be mottled by using plastic compositions in two colors and adding lumps of each along the mixing roll so that as they flatten out on the saturated felt a two-colored or multicolored effect is obtained. This procedure, however, gives no regular design, and in order to obtain a geometrical pattern on the tread two procedures may be adopted.

(1) Inlays may be formed in the tread as described in my copending application Serial No. 148,112, or (2) The required design may be printed on the surface by means of a printing roll or printing press. For this purpose, I prefer to use what may be termed a nitrocellulose ink, that is, a composition of a thick consistency, approximating that of printing ink and containing pigment.

Since nitrocellulose solutions dry rather quickly in thin layers, and therefore would very quickly gum the printing roll or "type" employed, I may likewise employ wax in the nitrocellulose ink to prevent the rapid evaporation of the solvents from this coating medium. In the present case it is not so desirable to use highly volatile solvents such as those mentioned above, as the odor of the high boiling solvents more quickly escapes from the thin layers of the ornamental design, this being simply a thin surface decoration. Therefore, heavier solvents such as primary or secondary butyl and amyl acetates, secondary hexyl acetate, ethyl lactate, diacetone alcohol, mesityl oxide, and the like, may be used. Furfural, a good nitrocellulose solvent also may be employed more particularly when the darker shades of the printing medium are to be applied. A small amount of wax, say, 1 or 2 per cent, or less, dissolved in the nitrocellulose medium, provides the means of regulating the rate of evaporation and by retarding it to the desired degree, enables the composition to be used as a printing-out medium. In the rotary press the degree of retardation of evaporation need not be so great as in the case of the horizontal presses which usually have to be of considerable length and carry huge wooden imprinting forms to which the coating composition is applied. A horizontal press of this character may contain ten or more of such huge imprinting means, each carrying a separate color and working alternately as the web feeds forward along the press, so that a finished design is ultimately formed on the surface of said web and it is then ready to pass into a drying chamber to eliminate the solvent. So much surface is exposed to the printing-out composition in these large presses of the horizontal type, that evaporation, if rapid, would be a very disturbing factor which would tend to seriously clog the imprinting plates. The introduction of the wax makes possible the coating of the surface without the disturbing effect of objectionable evaporation, also, it prevents the escape of solvents in the operating room, at least to such an extent that a serious hazard to health would result.

The wax which I prefer to employ is mineral wax, namely; paraffin and particularly ceresin wax, the latter being amorphous, is less likely to crystallize in solution or in the surface of the finished material.

Since the presence of wax may tend to cause a flatter finish, that is, less lustre of surface, I may treat the dried printed floor covering by passing it through a burnishing or polishing roll, or may lacquer the surface with a transparent lacquer, or treat it in any other appropriate way to improve the surface finish.

The printing-out process described in the foregoing may be conducted on the tread sheeted as described into contact with the saturated felt. Or, in some cases, the sheeted tread may be omitted and the printing-out process applied directly to the saturated felt base. In this manner the durable effect of nitrocellulose may be obtained directly on the saturated felt.

While I have specifically mentioned heavier solvents employed with the wax in such printing-out processes, the use of cheaper and more volatile solvents likewise with wax is not precluded.

A cheap solvent medium for nitrocellulose and one which is slow of evaporation and also has very little tendency to cause discoloration through bleeding of asphalt from the saturated fibrous web is made by treating acetone with a small amount of alkali. The vehicle may contain diacetone alcohol, mesityl oxide and other condensation products. This vehicle can be used to dissolve nitrocellulose, with or without synthetic resins, and with a sufficient amount of pigment to supply a medium for use on printing blocks to form the designs or patterns on the tread side of the felt. Such condensation products of acetone are quite slow in evaporation and therefore may be used without wax, or, if desired, a small amount of paraffin or ceresin wax may be incorporated.

The term non-oily as used herein, means that the surface of the saturated felt is free from greasy or oily exudations from the asphaltic or blown oil constituents of the web, affording a surface on which nitrocellulose solutions will spread and to which when dried, nitrocellulose with pigment, plasticizer, synthetic resin, and the like, will adhere firmly. If an oily, greasy surface exists there is danger that the coating applied by the printing blocks, or the sheeting applied by the rolls will be poorly adherent and will flake off quickly under service conditions.

The terms saturated felt, or saturated felt base, saturated fibrous web or webbing, used herein all refer to strips or pieces of fibrous material of appropriate strength, e. g., absorptive paper from wood pulp or rags, or mixtures of these; such felt or webbing being of a thickness adequate to furnish a heavy but flexible backing for the tread material, or with sufficient cushioning effect to be suitable for floor covering purposes; the saturating or impregnating material being a flexible or yielding waterproofing agent of the type of pitch or asphalt, including artificial pitches and asphalts such as those made from blown petroleum residues.

In the drawing the saturated base is shown carrying the tread composition made in accordance with the compositions described herein.

The following will illustrate the present invention:

*Example 1.*—140 parts by weight celluloid nitrocellulose of about 30 seconds viscosity, stated in terms of lacquer viscosity measurements and containing approximately 40 parts of denatured alcohol, so that the net weight of the celluloid nitrocellulose was 100 parts, was mixed with tricresyl phosphate 133 parts, and a solvent mixture 190 parts. The latter was made in the proportion of 3 parts of acetone to 2 parts of cracked gasoline having a boiling point of 80–160° C. The mixture was thoroughly agitated until a good solution resulted, whereupon 175 parts ground cork (about 80 mesh), 75 parts whiting, 25 parts chrome green, 100 parts acetone, and 5 parts of paraffin wax dissolved in some of the solvent was added. After thorough mastication in a Werner Pfleiderer mixer, the semi-solid plastic resulting was sheeted onto one side of strips of saturated felt, by means of differential sheeting rolls. This was carried out at room temperature, and it was observed that the plastic sheeted readily and did not dry up quickly. On the other hand, when saturated felt carrying a sheet or layer of the plastic was placed in an oven at 40° C., drying occurred very rapidly. Also, it was found possible to apply a second sheet on the first to make a thicker tread. The adhesion was good. Likewise, by drying and passing through the rolls a third time with some of the plastic composition a third layer was applied to the tread.

*Example 2.*—140 parts by weight of celluloid cotton containing denatured alcohol, as above, represented by 100 parts of the cotton, net weight, 133 parts dibutyl phthalate and 50 parts of sulphured cottonseed fatty acid phthalic glyceride resin dissolved in a mixture of equal parts of benzol and ethyl acetate were well mixed until the nitrocellulose was dissolved. 25 parts of green pigment, 175 parts ground cork, 75 parts of whiting and 5 parts of paraffin wax, dissolved in a small amount of benzol, were added. After thorough mastication in a Werner Pfleiderer mixer, the semi-solid plastic was sheeted on saturated felt to form a floor covering material.

The sulphured resin referred to was made by reacting 49 parts glycerol, 80 parts phthalic anhydride and 45 parts denatured cottonseed fatty acids, carrying the temperature to about 240° C., to produce a resinous substance which was dissolved in a solvent composed of approximately equal parts benzol and ethyl acetate and treated with sulphur monochloride in an amount equal to 1 part by weight to 100 parts of the foregoing resinous material. By such sulphur treatment the melting point of the resin was raised somewhat and the slightly tacky qualities which it previously possessed disappeared. A small amount of magnesium carbonate was added to the solution to neutralize any free hydrochloric acid and the resin employed in the above composition, as stated.

*Example 3.*—A printing composition was made from zinc oxide 20 parts by weight, Prussian blue 1 part, cottonseed fatty acid phthalic glyceride resin 10 parts, nitrocellulose (high viscosity) 10 parts, dibutyl phthalate 6 parts and acetone condensation products boiling 87–160° C. 100 parts. The nitrocellulose and resin were first dissolved in portions of the acetone condensation product, then admixed and the pigments and other ingredients added. With this composition it was possible, using a wooden printing block, to print designs on a saturated felt base, both directly on the untreated saturated felt and also on felt which had been given a coat of varnish or lacquer. The acetone condensation product was found to be fairly slow drying at room temperature, but when heated in an oven at 40° C., drying took place fairly rapidly in the thin layers resulting from printing.

*Example 4.*—Celluloid nitrocellulose 10 parts and cotton seed fatty acid phthalic glyceride resin 10 parts were dissolved in a mixture of 100 parts of volatile solvent composed of 3 parts acetone to 2 parts benzol. This solvent mixture was saturated with paraffin wax by allowing the wax to stand in contact with it until no more dissolved at room temperature. The nitrocellulose and resin solution was incorporated with zinc oxide 20 parts, Prussian blue 3 parts and tricresyl phosphate 6 parts. As in Example (3) a wooden printing block was used to produce a design in colors on saturated felt. It was found that the composition did not dry rapidly, but remained moist, so that printing could be carried out very readily. Evaporation of the solvent from the coating applied by such printing block progresses very slowly at room temperature, but on exposing to a temperature of 40° C. the solvent is readily removed.

What I claim is:—

1. The process of making floor covering which comprises sheeting on a web of saturated felt saturated with a waterproofing agent of the asphalt type at least one tread layer of a composition comprising nitrocellulose, plasticizer, a volatile solvent mixture, wax and a filler; and drying at a temperature above that at which wax dissolves freely in said volatile solvent mixture.

2. The process of making floor coverings which comprises sheeting on a web of saturated felt saturated with a waterproofing agent of the asphalt type a plurality of tread layers of a composition comprising nitrocellulose, plasticizer, a volatile solvent mixture, wax and a filler, and in subsequently removing the volatile solvent mixture by evaporation.

3. A floor covering comprising a web of saturated felt saturated with a waterproofing agent of the asphalt type having attached thereto on one side thereof a tread layer comprising nitrocellulose, plasticizer, filler and a wax.

4. A floor covering comprising a web of saturated felt saturated with a waterproofing agent of the asphalt type having attached thereto on one side thereof a tread layer comprising celluloid nitrocellulose, plasticizer, filler and a wax.

5. A non-curling, self-flattening floor covering of non-oily saturated fibrous webbing saturated with a waterproofing agent of the asphalt type, carrying on the tread side an adherent figured coating comprising pigment, nitrocellulose and a small proportion of wax.

6. A non-curling, self-flattening floor covering of non-oily saturated fibrous webbing saturated with a waterproofing agent of the asphalt type, carrying on the tread side an adherent figured coating comprising pigment, celluloid-nitrocellulose and a small proportion of wax.

7. A floor covering comprising saturated felt saturated with a waterproofing agent of the asphalt type carrying a printed design in color containing nitrocellulose, plasticizer, pigment and wax.

8. A floor covering comprising a supporting material consisting of webbing saturated with asphaltic bodies carrying on the tread side a printed design in color containing nitrocellulose, a synthetic resin compatible therewith, tricresyl phosphate, pigment and wax.

9. A non-curling floor covering of saturated fibrous webbing saturated with a waterproofing agent of the asphalt type free from repellant oily material and carrying on the tread side an adherent flexible figured coating comprising nitrocellulose, a synthetic resin compatible therewith, a pigment and a small proportion of wax.

10. The process of making floor covering which comprises sheeting on a web of saturated felt at least one tread layer of a composition comprising nitrocellulose, plasticizer, a volatile solvent mixture, wax and a filler; and drying at a temperature above that at which wax dissolves freely in said volatile solvent mixture; and burnishing the wax tread at a temperature insufficient to soften the saturant of the felt.

11. The process of making floor covering which comprises sheeting on a web of saturated felt a plurality of tread layers of a composition comprising nitrocellulose, plasticizer, a volatile solvent mixture, wax and a filler, subsequently removing the volatile solvent mixture by evaporation, and burnishing said tread composition by heat treatment at a temperature and for a length of time insufficient to dislodge the saturant of the felt.

12. The process of making floor coverings which comprises sheeting on a web of saturated felt saturated with a waterproofing agent of the asphalt type, a plurality of tread layers comprising nitrocellulose, plasticizer, a synthetic resin, a volatile solvent mixture, and wax, and sufficient filler to make the composition yielding but non-flowing.

13. The process of making floor coverings which comprises sheeting on a web of saturated felt saturated with a waterproofing agent of the asphalt type, a nitrocellulose tread layer, and printing on said tread layer with a nitrocellulose ink containing wax.

14. A floor covering as set forth in claim 3 in which the tread layer has a burnished finish.

15. A floor covering as set forth in claim 3 in which the wax is a high melting point wax and the tread has a burnished finish.

16. A non-curling, self-flattening floor covering of non-oily saturated fibrous webbing saturated with a waterproofing agent of the asphalt type, carrying on the tread side an adherent figured coating comprising pigment, nitrocellulose and a mineral wax.

17. A floor covering comprising a web of saturated felt saturated with a waterproofing agent of the asphalt type having attached thereto on one side thereof a tread layer comprising celluloid nitrocellulose, plasticizer, filler and a wax; said tread layer carrying an adherent figured coating comprising pigment, nitrocellulose and a small proportion of wax.

18. A floor covering comprising a web of saturated felt saturated with a waterproofing agent of the asphalt type having attached thereto on one side thereof a tread layer comprising nitrocellulose, plasticizer, filler and a high melting point wax; and said tread layer carrying a printed design in color containing nitrocellulose, plasticizer, pigment and a mineral wax.

CARLETON ELLIS.